Dec. 10, 1940.   A. J. PENICK ET AL   2,224,447
VALVE ASSEMBLY
Filed Nov. 10, 1938   2 Sheets-Sheet 2

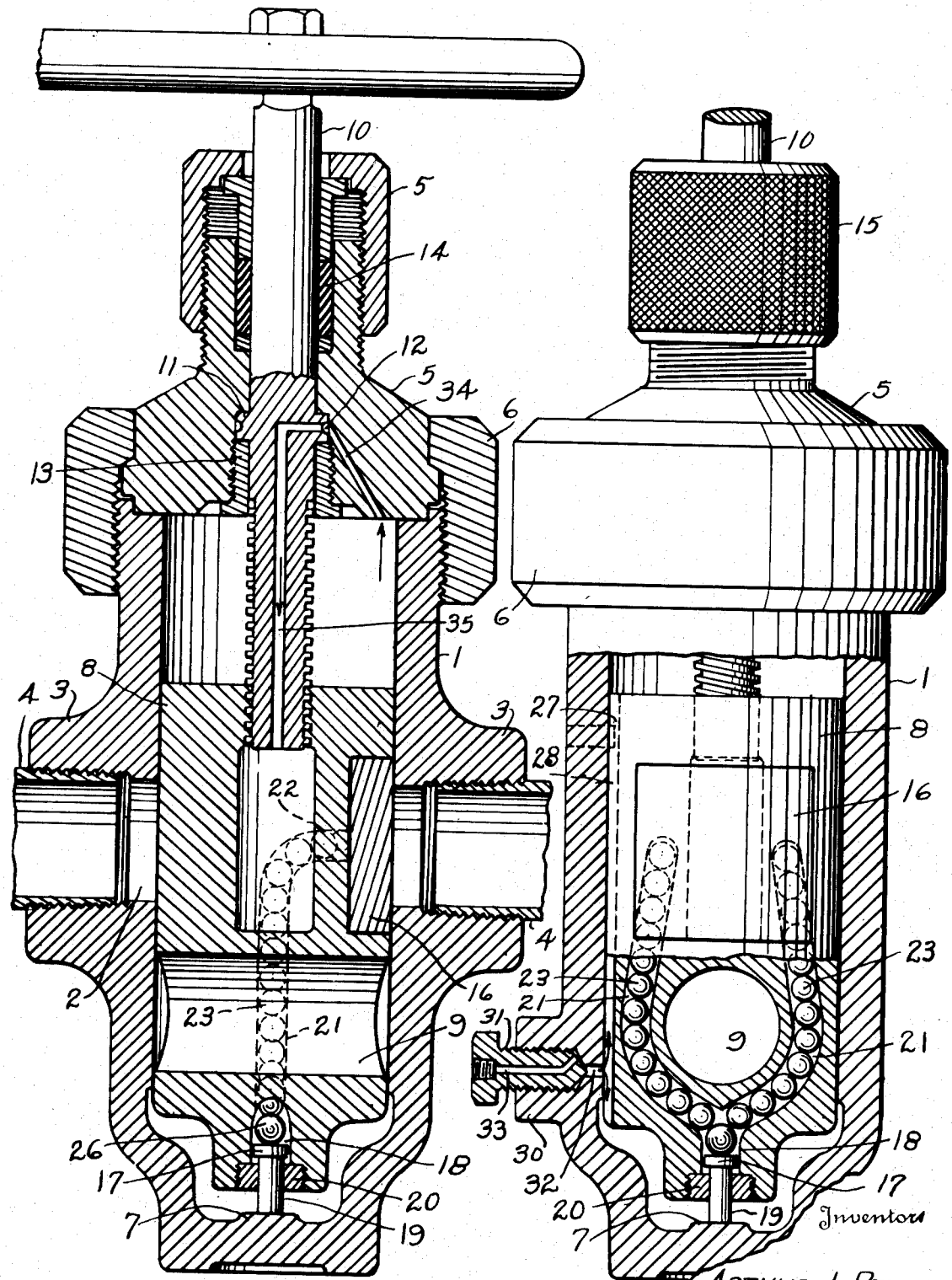

Inventors
ARTHUR J PENICK
KIRBY T. PENICK

Edward V. Hardway
Attorney

Patented Dec. 10, 1940

2,224,447

UNITED STATES PATENT OFFICE 2,224,447

VALVE ASSEMBLY

Arthur J. Penick and Kirby T. Penick, Houston, Tex.

Application November 10, 1938, Serial No. 239,830

1 Claim. (Cl. 251—62)

This invention relates to a valve assembly.

The invention has particular relation to an assembly embodying a valve casing having a fluid passageway therethrough, a valve in the casing movable into one position to open the passageway and into another position to close the passageway with novel mechanical means whereby a fluid tight seal will be formed around the passageway by the valve when the valve is in closed position.

The invention embodies certain improvements over the types of construction disclosed in our co-pending applications, Serial No. 186,625 filed January 4, 1938, and Serial No. 235,387 filed October 17, 1938.

An object of the invention is to provide novel mechanically actuated means embodied in the valve itself whereby a fluid tight relation between the valve and casing will be effected when the valve is in closed position.

Another object of the invention is to provide in a valve assembly novel means for supplying a lubricant to the working parts.

More specifically the invention embodies a valve having a movable side section with means for automatically and mechanically applying force against the inner side of the movable side section, when the valve is in closed position, to, in effect, increase the outside diameter of the valve to thereby cause it to fit more closely about the passageway through the casing to form fluid tight seals about the passageway.

With the above and other objects in view the invention has particular relation to certain novel features of construction, operation and arrangement of parts, examples of which are given in this specification and illustrated in the accompanying drawings, wherein:

Figure 1 shows a longitudinal, sectional view of the assembly showing the valve in closed position.

Figure 2 shows a fragmentary, side elevation, partly in section, showing the valve in closed position and taken at right angles to the view shown in Figure 1.

Figures 3, 4, 5:
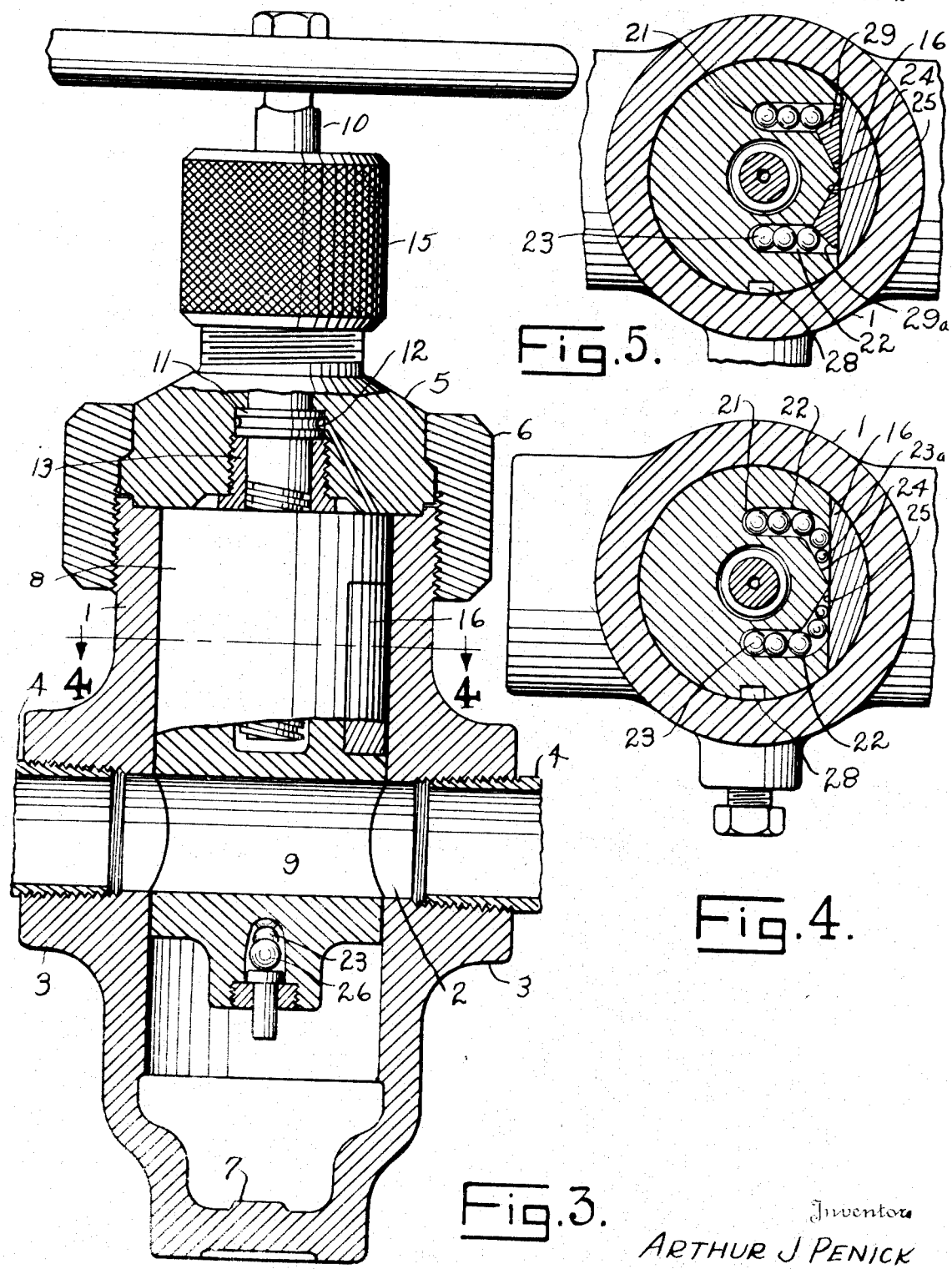
Figure 3 shows a longitudinal, sectional view showing the valve open.
Figure 4 shows a cross-sectional view taken on the line 4—4 of Figure 3.
Figure 5 shows a cross-sectional view of another embodiment.

Referring now more particularly to the drawings wherein like numerals of reference designate the same parts in each of the figures, the numeral 1 designates the valve casing which is preferably of cylindrical shape in cross-section as more clearly shown in Figures 4 and 5, and which has a passageway 2 for fluid therethrough. Around the passageway, on each side are the tubular connections 3, 3 for connecting the casing into the adjacent sections 4 of the flow line. On one end of the valve casing there is a bonnet 5 which may be secured thereon in any preferred manner but which is shown secured on the casing by means of the clamp nut 6. The opposite end of the casing is closed and is provided with an inside stop 7.

Fitted into the casing there is a cylindrical valve 8 having a passageway 9 therethrough adapted to be brought into and out of registration with the passageway 2 through the casing. When this passageway 9 is aligned with the passageway 2 the valve will be open and a continuous smooth conduit will be provided through the assembly which will not collect detritus or other foreign matter. When the valve is moved to closed position a very tight seal will be formed by it around the passageway 2 to prevent leakage.

The valve may be actuated into either of said positions by a rotatable stem 10 whose inner end has a coarsely threaded connection with the valve and whose outer end has a swiveling connection with the bonnet. This swiveling connection is provided by means of the annular rib 11 around the stem which has an external, annular groove 12 therearound and which is seated in the bonnet and is retained therein by a gland 13 which is screwed into the inner side of the bonnet as shown in Figures 1 and 2. Beyond the rib 11 the stem 10 is surrounded by a stuffing box 14 which is retained in place by the flange nut 15 screwed onto the outer end of the bonnet.

Countersunk into one side of the valve there is a movable section 16 which forms a part of the valve 8 proper. On the valve opposite the stop 7 there is a plunger 17 which works in a cylinder 18 in the valve. The plunger 17 has an outwardly extended stem 19 working through a gland 20 in the valve. Leading from the cylinder 18 around the passageway 9 through the valve are the channels 21, 21, whose inner ends 22 are turned outwardly as shown in Figure 4 and converge toward each other as also shown in Figure 4. The channels 21 contain the balls 23, there being a series of balls in each channel as shown more accurately in Figure 2. In the overturned converging ends of the channels the balls 23a are made of gradually decreasing diameter working between the converging faces 24 of the valve and the inside plane face 25 of the movable section 16. The balls 23, 23a are in adjacent relation and in the cylinder 18 there is a larger ball 26 which is in contact with the adjacent balls of each series as shown in Figure 2 and which rests against the plunger 17.

When the valve is in open position as shown in Figure 3 the pressure of the series of balls in the channels will be released from the inner face 25 of the movable section 16 and said section or seat, 16 will be relaxed and the valve may be readily moved to closed position to carry the seat 16 into alignment with the passageway 2 as shown in Figure 1. Just before the valve reaches its final closed position the outer end of the stem 19 will contact against the stop 7 and upon final movement of the valve to closed position the plunger 17 will act against the ball 26 and force will be transmitted through the series of balls 23 and 23a to wedge the balls 23a between the tapering faces 24 of the valve and the plane face 25 of the movable section 16 which will force said section outwardly into close contact with the wall of the casing around the passageway on that side of the casing. This will operate by reaction to force the valve 8 in the opposite direction and closely against the opposite side of the casing around the passageway 2. The outer surface of the section or seat 16 is flush, or approximately flush, with the outer surface of the valve. It is to be noted that the valve is splined in the casing against rotation by means of the spline 27, a longitudinal keyway 28 being provided in the valve to receive this spline and the spline has sufficient clearance in the keyway so that when the seat 16 is moved outwardly into close fitting relation with the valve casing around the passageway 2 the valve will have sufficient movement in the opposite direction to form a close fitting seal around the passageway 2 on the opposite side of the valve casing.

As illustrated in Figure 5 wedges 29 may be fitted between the tapering faces 24 of the valve and the opposing plane face 25 of the section 16 in lieu of the balls 23a. The outer ends of the wedges 29 have the tapering faces 29a against which the adjacent balls 23 contact so that when the valve is moved to closed position as shown in Figure 1 the force of the plunger 17 acting against the series of balls will react against the tapering faces 29a of the wedges 29 and force said wedges inwardly, toward each other, which in turn will force the movable section 16 outwardly into sealing engagement with the inside wall of the casing around the passageway 2.

Means for lubricating the relatively movable parts of the valve assembly have been provided and which will now be described:

Threaded into the boss 30 of the casing 1 there is a set screw 31 the inner end of which is pointed and normally closes the lubricant duct 32 leading into the key way 28. This set screw has an axial channel 33 whose outer end is internally threaded for the connection of a grease gun thereto and whose inner end is turned laterally so as not to align with the duct 32. When it is desired to fill the casing with the lubricant the set screw 31 will be partly unscrewed so as to open the duct 32. A grease gun may then be connected thereto and a suitable lubricant forced into the valve casing to fill the same. This lubricant will pass each way along the keyway 28 into the valve casing on opposite sides of the valve. The bonnet has a duct 34 leading from within the casing and terminating at the groove 12 and leading from this groove there is a duct 35 which continues on axially through the stem 10 into the interior of the valve to provide ample lubricant for lubricating the threads connecting the stem to the valve.

A sufficient quantity of lubricant may thus be maintained in the valve casing to properly lubricate the assembly.

What we claim is:

A valve assembly comprising a valve casing having a passageway therethrough for fluid, a valve in the casing movable to one position to open said passageway and to another position to close the passageway, a movable side section on the valve located to register with and close said passageway upon movement of the valve to closed position, said valve having a channel terminating at one end in a cylinder and at its other end at said section, a series of balls filling said channel and means arranged to act against said series, upon movement of the valve to closed position whereby said movable section will be forced outwardly into close contact with the inside wall of the casing.

ARTHUR J. PENICK.
KIRBY T. PENICK.